Patented June 29, 1926.

1,590,525

UNITED STATES PATENT OFFICE.

FRANK O. KICHLINE, OF LEBANON, PENNSYLVANIA, ASSIGNOR TO BETHLEHEM STEEL COMPANY, A CORPORATION OF PENNSYLVANIA.

PROCESS OF EXTRACTING NICKEL AND COBALT FROM FERRUGINOUS ORES.

No Drawing.  Application filed October 10, 1922. Serial No. 593,642.

The present invention relates to processes of extracting nickel and cobalt from ferruginous ores.

It is at the present time common practice to extract nickel and cobalt from ferruginous ores by sulphatization, that is, by reducing the ores to sulphate by roasting, and then leaching the calcine. More specifically described, the process consists in the roasting of the ores carrying iron, nickel, cobalt, etc., at a temperature between 900 and 1000° F. in the presence of sulphur and dissolving or leaching out the soluble metallic salts. The sulphur may be that which is naturally contained in the ore or may be added to the charge in the form of pyrites, brimstone or $SO_2$ gas. As a result of this sulphatization, a large part of the nickel or cobalt is rendered soluble in weak acid or water, as well as a considerable portion of the iron, alumina, manganese, etc. It has been found that when the roasting temperature is raised above 1000°, some of the nickel, cobalt, iron, alumina, etc., which has been rendered soluble by roasting at the lower temperature is again rendered insoluble and hence from 900 to 1000° F. has been considered the limit to which the roasting temperature may be raised.

The object of the present invention is to provide an improved method of treating ferruginous ores containing cobalt and nickel whereby a greater amount of these metals may be recovered than has been found possible heretofore.

The process is generally similar to the prior art process above described but the roasting temperature is increased and the ores are roasted in the presence of an alkaline metal salt. I have discovered that by adding an alkaline metal salt to the ore, such as sodium or potassium sulphate or bisulphate, that the roasting temperature may be considerably raised, say from 900°–1000° F. to 1150°–1300° F., with the result that increased quantities of the metals being sought are rendered soluble and may be recovered by a subsequent leaching process. Due to the addition of the alkaline metal salt, soluble double or compound salts of the several metals are formed, such as nickel sodium sulphate, and these salts are more stable and will not become insoluble at temperatures between 1150° and 1300°. On the contrary, at the increased temperature, larger quantities of these metals are converted into the soluble state and can be recovered.

The addition of alkaline metal salts does not affect the sulphates of iron and alumina to the same degree as the sulphates of nickel and cobalt and when a charge is being roasted at temperatures varying between 1150° F. and 1300° F., a considerable portion of the soluble iron and alumina salts are broken up and revert to the insoluble state. It follows that in leaching the calcine from a roast of a charge of ore containing nickel, cobalt, manganese, iron, alumina, etc., which roast contained a suitable proportion of alkaline metal salt, the leached solution will contain more nickel, cobalt and manganese and less iron and alumina than can be obtained without the addition of the alkaline metal salt to the charge particularly if the roasting temperature is carried up to 1150 to 1300° F.

I give below an explanation of the manner in which the process is carried out in connection with each of two grades of ore and tabulations of the results obtained, so that one skilled in the art can readily practice the invention.

In the first instance Mayari iron ore from Cuba was treated, the analysis of this ore after drying at 212° being as follows:

|  | Per cent. |
|---|---|
| Ni | 1.42 |
| Co | .13 |
| Cr | 2.01 |
| Fe | 47.70 |
| Mn | 0.65 |
| P | 0.015 |
| S | 0.025 |
| $SiO_2$ | 4.32 |
| $Al_2O_3$ | 4.26 |
| CaO | 0.08 |
| MgO | 0.71 |

The ore was thoroughly mixed with 2½% of its weight of sulphur and 20% of its weight of nitre-cake (acid sodium sulphate). This mixture was placed in a muffle furnace and the temperature gradually raised to 900° F. After holding the charge at approximately 900° F. for one-half hour, a sample of the charge was removed from the furnace and the temperature then raised successively at one-half hour intervals to 1150°

F., 1200° F. and 1250° F. Samples were taken from the furnace at each of the above specified temperatures.

The four samples were leached separately with hot solutions containing 2% sulphuric acid, the temperature of the solutions closely approaching 212° F. After leaching, each solution was analyzed for nickel, cobalt, iron, manganese, alumina and silica. In the following table, the amount of each element leached from the different samples is given, the amounts being expressed in percentage of the amounts of the elements contained in the original ore before treatment. These figures, therefore, represent the percentage of each element which was in a soluble state at each stage of the roasting process:

| Temperature. | Ni and Co. | Fe. | Mn. | Al₂O₃. | SiO₂. |
|---|---|---|---|---|---|
| Degrees F. | | | | | |
| 900 | 62.8 | 22.7 | 74.5 | 52.0 | 30.2 |
| 1150 | 68.0 | 12.9 | 76.6 | 45.0 | 13.3 |
| 1200 | 70.2 | 9.8 | 85.0 | 42.2 | 10.7 |
| 1250 | 68.4 | 6.6 | 88.3 | 35.8 | 7.6 |

In a second demonstration of the process with Mayari iron ore of the same composition as given above, I mixed with the ore sulphur to the extent of 5% of the original weight of the ore, and nitrecake to the extent of 25% of the weight of the ore. After thoroughly mixing the charge, its temperature was slowly raised in a muffle furnace to 900° F., held at this point for half an hour, and subsequently held for half an hour at temperatures 1150° F., 1200° F. and 1250° F., samples of the calcine being taken from the furnace at each temperature. These samples were leached with plain hot water at a temperature closely approaching boiling. Analysis of the leached solution in each case indicated that the following percentages of the various ingredients were in a soluble state at the temperatures indicated:

| Temperature. | Ni and Co. | Fe. | Mn. | Al₂O₃. | SiO₂. |
|---|---|---|---|---|---|
| Degrees. | | | | | |
| 900 | 52.8 | .2 | 63.8 | 12.3 | 8.0 |
| 1150 | 66.9 | .1 | 88.0 | 8.5 | 5.7 |
| 1200 | 67.0 | .1 | 90.0 | 25.7 | 3.8 |
| 1250 | 74.2 | .1 | 93.4 | 18.5 | 1.4 |
| 1300 | 62.5 | .1 | 86.7 | 8.2 | 2.1 |

A study of the results obtained by carrying out the novel process, in a number of instances, indicated that the presence of an alkaline metal salt in the ore being roasted causes the percentage of soluble, cobalt nickel and manganese to increase when the roasting temperature is increased from 900° F. to between 1150° F., say to 1250° F., while the percentages of soluble iron, alumina, and silica decrease as the temperature is increased above say 900° F. This is true for both plain water leaching and weak acid leaching, but I prefer to leach with hot water as the iron, alumina and silica are less soluble in plain water than in the weak acid solution and as a result the solution is relatively much richer in cobalt and nickel.

From the above description of the process and the examples given it is believed that one experienced in the art to which the invention pertains will have no difficulty in carrying out the process and in obtaining the results specified. It will be obvious, of course, that minor changes may be made in the percentages of alkaline metal salt added to the ore and in the temperature to which the ores may be raised. The original composition of the ore being treated may necessitate changes in the proportions of the alkaline metal salt and the temperatures and the invention contemplates that changes in and adjustments of the process may be made to conform with varying circumstances.

Having thus described the invention what is claimed as new and desired to be secured by Letters Patent is:

1. The process of recovering nickel from a complex iron ore which consists in adding an alkali metal sulphate to the ore, in roasting the mixture to approximately 1250° F., whereby the nickel is acted upon to form an alkaline metal sulphate of nickel and whereby alkaline metal sulphates of other metals including iron are largely decomposed and such other metals to the extent of the decomposition are rendered insoluble.

2. An improved process of the nature disclosed for treating ferruginous ores containing nickel and cobalt consisting in adding an alkaline metal salt to the ore and in roasting the mixture of ore and alkaline metal salt at a temperature varying between 1150° F. and 1300° F. whereby soluble double salts of nickel and of cobalt with the alkaline metal are formed.

3. An improved process of the nature disclosed for treating ferruginous ores containing nickel and cobalt consisting in adding sodium sulphate to the ore and in roasting the mixture at a temperature favoring the production of soluble double sulphates of sodium and nickel and of sodium and cobalt, said temperature being such that the soluble salts of iron, silica and alumina naturally present in the ore or which have been formed at lower temperatures shall be largely broken up and thereby rendered insoluble.

4. An improved process of the nature disclosed for treating ferruginous ores containing nickel and cobalt and having suitable amounts of alkaline metal compounds such as sodium or potassium sulphate or bisulphate naturally present in the ores or added thereto consisting in roasting the mixture at a temperature between 1150° F. and 1300° F. in order that soluble double salts of said alkaline metal with nickel, with cobalt, and with manganese shall be formed, said temperature being such that the salts of iron, silica, and alumina shall be rendered insoluble, and in leaching the calcine.

5. An improved process of the nature disclosed for treating ferruginous ores to obtain nickel and cobalt consisting in adding niter-cake in amounts suitable to the composition of the ore, roasting the mixture at a temperature of 1250° F., whereby soluble double salts of sodium and nickel and of sodium and cobalt may be formed, and leaching the calcine.

In testimony whereof I hereunto affix my signature.

FRANK O. KICHLINE.